(No Model.)
N. NEWMAN.
POST HOLE AUGER.
No. 400,939. Patented Apr. 9, 1889.
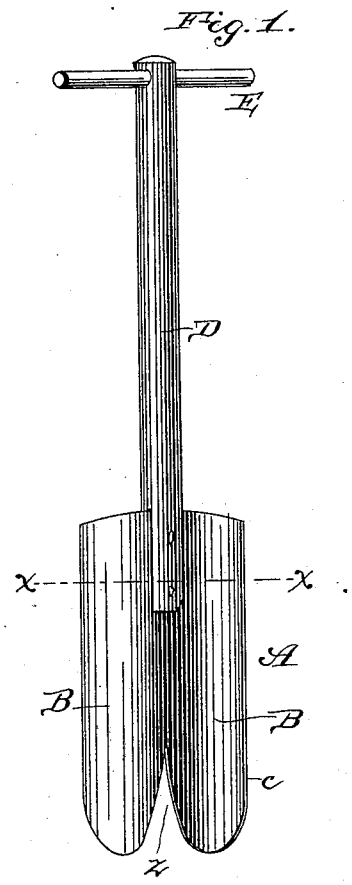
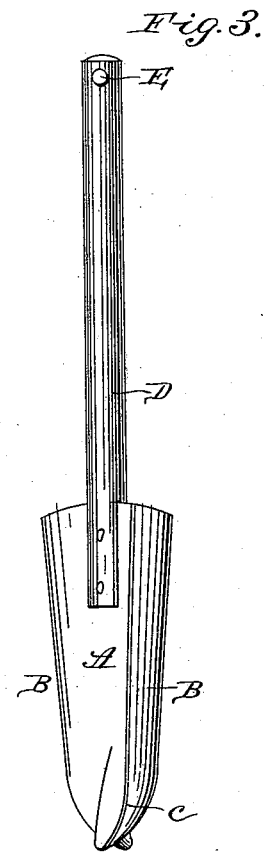
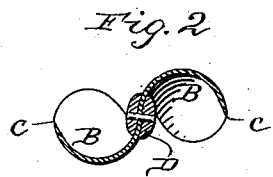
WITNESSES
Geo. H. Hibbs
Rob. Houston
INVENTOR,
Nelson Newman
per Freeman and Money
Attorneys

UNITED STATES PATENT OFFICE.

NELSON NEWMAN, OF SPRINGFIELD, ILLINOIS, ASSIGNOR OF ONE-HALF TO GEORGE A. SANDERS, OF SAME PLACE.

POST-HOLE AUGER.

SPECIFICATION forming part of Letters Patent No. 400,939, dated April 9, 1889.

Application filed July 25, 1888. Serial No. 280,978. (No model.)

*To all whom it may concern:*

Be it known that I, NELSON NEWMAN, a citizen of the United States, residing at Springfield, in the county of Sangamon and State of Illinois, have invented certain new and useful Improvements in Post-Hole Augers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in post-hole augers; and it consists in a boring-head having concavo-convex blades or wings inclined in opposite directions and provided with rounded lower ends and cutting-edges, all as will be more fully set forth hereinafter.

In the drawings hereto annexed, Figure 1 is an elevation of a post-hole auger embodying my improvements. Fig. 2 is a horizontal sectional view of the same, taken on the line $x \, x$ of Fig. 1. Fig. 3 is a side elevation.

A represents the boring-head, which is made of sheet or plate steel of suitable thickness, and is provided with a pair of blades or wings, B. The said blades or wings are concavo-convex in transverse section, are arranged so that their concave sides face in opposite directions, and said blades or wings are also inclined in opposite directions, as shown in Fig. 3.

An inverted-V-shaped cut, Z, is made in the lower side of the boring-head, at the center of the same, so as to divide or separate the lower ends of the blades or wings, and said lower ends of the blades or wings are rounded. The edges $c$ of the said blades or wings are sharpened, and thereby adapted to cut the soil.

To the upper end of the boring-head, at the center of the same, is secured the lower end of a standard or handle, D, which has a cross-bar or lever, E, at its upper end, whereby the operator may rotate the implement to cause the same to bore into the earth.

Owing to the inclined positions of the blades or wings, the concave sides of the same form guides or conduits to direct the earth which is cut by the points or lower ends of the blades to and over the upper sides of the same, and thereby remove the earth from the hole.

Having thus described my invention, I claim—

The auger-head made of a single piece of metal and having the oppositely-inclined blades B, concavo-convex in cross-section, said blades being further provided with the separated rounded lower ends and with the sharpened cutting-edges C, substantially as described.

In testimony whereof I affix my signature in presence of two witnesses.

NELSON NEWMAN.

Witnesses:
  WM. R. BOWERS,
  GEO. A. SANDERS.